United States Patent
Dumitru et al.

(10) Patent No.: US 11,356,422 B2
(45) Date of Patent: Jun. 7, 2022

(54) SECURE COMMUNICATION SYSTEM AND METHOD

(71) Applicant: CYBERSWARM, INC., San Mateo, CA (US)

(72) Inventors: Viorel-Georgel Dumitru, Ploiesti (RO); Stefan-Laurentiu Pircalabu, Ploiesti (RO); Octavian-Narcis Ionescu, Ploiesti (RO); Constantin-Ionut Marica, Ploiesti (RO); Victor-Andrei Marica, Ploiesti (RO); Mihai Tiberiu Luca, Buchare (RO)

(73) Assignee: CYBERSWARM, INC., San Mateo ( * ) Notice: Subject to any disclaimer, the term of this patent is extended or adjusted under 35 U.S.C. 154(b) by 235 days.

(21) Appl. No.: 16/672,044

(22) Filed: Nov. 1, 2019

(65) Prior Publication Data

US 2021/0136044 A1 May 6, 2021

(51) Int. Cl.
*H04L 9/08* (2006.01)
*H04L 9/40* (2022.01)
*H04L 9/14* (2006.01)

(52) U.S. Cl.
CPC ........ *H04L 63/0428* (2013.01); *H04L 9/0819* (2013.01); *H04L 9/0861* (2013.01); *H04L 9/14* (2013.01)

(58) Field of Classification Search
None
See application file for complete search history.

(56) References Cited

U.S. PATENT DOCUMENTS

| | | | | |
|---|---|---|---|---|
| 2014/0028404 A1* | 1/2014 | Kihara | ...................... | H03K 3/84 331/78 |
| 2020/0213140 A1* | 7/2020 | Cambou | ............... | H04L 9/0643 |

* cited by examiner

*Primary Examiner* — Brandon Hoffman
(74) *Attorney, Agent, or Firm* — DLA Piper LLP (US)

(57) ABSTRACT

A system and method used for generating encryption keys on multiple devices and for encrypted data transfer between two or multiple devices. A sender system includes at least one sender device with nonlinear I-V characteristics. A receiver system includes at least one receiver device with nonlinear I-V characteristics. The at least one sender device with nonlinear I-V characteristics generates at least one sender output value used to create a string of characters or bits or bytes or numbers. The string of characters is used to encrypt data which is sent to the receiver device. The at least one receiver device with nonlinear I-V characteristics generates at least one receiver output value, and uses the at least one receiver output value to create the string of characters from the at least one receiver output value. A receiver processing unit generates the data from the encrypted data using the string of characters.

14 Claims, 8 Drawing Sheets

| Encryption string | Resistance Value | Voltage To Device 1 | Voltage to Device 2 |
|---|---|---|---|
| xG4sdw51 | 3000 - 3500 | 0.3 | 0.6 |
| G5hGtrt563 | 4000 - 4500 | 0.9 | 1.1 |
| 84 3c 1d | 2000 - 2500 | 0.1 | 0.3 |
| 00100101 | 2500 - 3000 | 0.2 | 0.5 |
| ght543 | 1000 - 2000 | 1.5 | 1.7 |

SECURE COMMUNICATION SYSTEM AND METHOD

FIELD OF THE INVENTION

This disclosure relates mainly to cyber security, providing safe data transfer between wired and wireless connected devices as well as improved device security. More specifically it relates to data encryption and data integrity check for data sent to or received from any type of device. Some embodiments may be used for IoT (Internet of Things) as they are lightweight, however, other embodiments could be used for more sensitive applications being capable to ensure a very strong encryption of data.

BACKGROUND

Assuring the security of communication in the increasingly connected world of our days is of paramount importance. This is especially true in the context of widespread future use of IoT devices. Data encryption would solve many of these problems, as it can be used for both data privacy and also for checking the integrity of the data sent to or received from an IoT device, preventing any malicious party to modify or read the data. This, however, has proven to be a daunting task for anyone attempting to fix the security problem. Nowadays the majority of state-of-the-art solutions to the cybersecurity problem for IoT and other kinds of devices are using software-based systems and algorithms but these solutions haven't yet proved to be secure enough. A solution for providing encryption for communications networks based on memristors is described in U.S. patent application Ser. No. 16/532,003, filed Aug. 5, 2019, entitled "Method and System for Data Validation Using Memristors", the contents of which are incorporated herein by reference in its entirety. The present disclosure describes another method of generating encryption keys that may use diodes and resistors instead of memristors or use memristors together with diodes or any other semiconductor device that presents a nonlinear I-V (current-voltage) characteristic that may vary depending on the production process of the given device.

SUMMARY

Disclosed is a system and method used for generating encryption keys on multiple devices and for encrypted data transfer between two or multiple devices. A sender system includes at least one sender device with nonlinear I-V characteristics, a processor unit including a sender generator constructed and arranged to generate at least one setting value or at least one reading value or both, a storage unit including one or more resistance to key translation tables, a hardware random number generator and a physical relay. A receiver system includes at least one receiver device with nonlinear I-V characteristics, a processor unit including a sender generator constructed and arranged to generate at least one setting value or at least one reading value or both, a storage unit including one or more resistance to key translation tables, a hardware random number generator and a physical relay. A first channel couples the sender and the receiver. A second channel, that may be different from the first channel, couples the sender and the receiver. The sender generator applies the at least one setting value or the at least one reading value or both to the at least one sender device with nonlinear I-V characteristics to cause the sender device with nonlinear I-V characteristics to generate at least one sender output value, and applies the at least one sender output value to the sender table to create a string of characters or bits or bytes or numbers. The processing unit encrypts data using the string of characters. The sender transmits the encrypted data to the receiver over the first channel to the receiver, and transmits a value related to the at least one setting value or the at least one reading value or both to the receiver over the second channel, or the transmitted values are send to both the sender and the receiver from a third device. The receiver generator applies the at least one setting value or the at least one reading value or both, based on the transmitted value to the at least one receiver device with nonlinear I-V characteristics to cause the receiver device with nonlinear I-V characteristics to generate at least one receiver output value, and applies the at least one receiver output value to the receiver table to create the string of characters from the at least one receiver output value. The receiver processing unit generates the data from the encrypted data using the string of characters.

BRIEF DESCRIPTION OF THE DRAWINGS

FIG. 4 shows how multiple devices may communicate based on the physical unclonable function devices and the encryption tables, where a given device may know only the attributed voltage values they need to send to the devices that it is allowed to send data to.

DETAILED DESCRIPTION

By using devices with Physical Unclonable Functions (PUFs) and the system and the method described in published patent application "Cybersecurity System for Internet of Things Connected Devices" (US 2019/0132340 A1), which is incorporated herein by reference in its entirety, and on other similar embodiments, encryption/decryption keys may be generated on multiple devices (thus the keys are never sent) at hardware level. This is possible using properties of devices with PUFs (that may be memristors, diodes, diodes and resistors, diodes and memristors, or any type of semiconductor device with a nonlinear I-V characteristic, etc.) and a separate channel or the same channel for transferring the reading and/or setting values from the sender device to the receiver device.

Figure 1A:
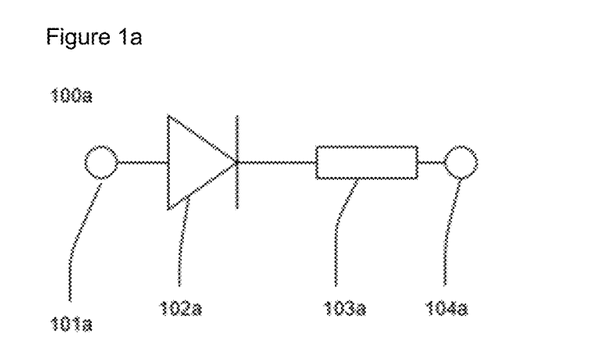
FIG. 1a illustrates a device with PUFs having a diode and a resistor.

FIG. 1a illustrates a device 100a with PUFs having a diode 102a and a resistor 103a. The diode may be made from silicon, gallium arsenide, gallium phosphide, silicon carbide, gallium nitride, zinc oxide, IGZO, or any other material known to be used for fabricating a diode. The diode may be a p-n diode, a p-i-n diode, a Schottky diode, an electroluminescent (LED) diode, a laser diode (LD), or any other type of known diode. The device 100a with PUFs having diodes and resistors may be made from discrete components or may be integrated on a chip. The diode fabrication process variations may induce differences of diode parameters like threshold and series resistance. Therefore, even for a lot of nominally identical diodes, each fabricated diode may have its unique characteristics. The same may be true for the resistor 103a connected with the diode 102a in FIG. 1a. Therefore, even for a lot of nominally identical devices having identical diodes and identical resistors, each device may have in fact its unique characteristic due to the fabrication process variations.

Figure 1B:
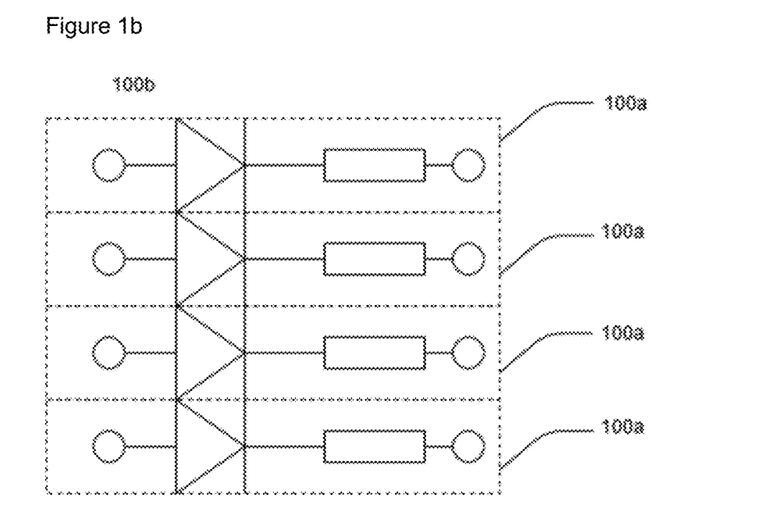
FIG. 1b illustrates a device with PUFs having an array of diodes and resistors.

However, in order to increase the security level, the devices with PUFs containing a diode and a resistor as illustrated in FIG. 1b may be constructed each with nominally different diodes and nominally the same resistors, or with nominally the same diodes and nominally different resistors or with nominally different diodes and nominally different resistors.

Also, while FIG. 1a illustrates a device with a PUF having a diode and a resistor, it should be understood that similar devices having two or more diodes and/or two or more resistors may also be employed.

Therefore, by choosing nominally different diodes and/or resistors and due to fabrication process variations induced parameters differences, each device having at least a diode and at least a resistor may have its own R-V characteristic, which is derived from the I-V characteristic.

Furthermore, as illustrated in FIG. 1b, each device 100b may contain an array of diodes and resistors. The diodes and resistors from the array may be further on connected in between in various ways like in series, in parallel, in bridge configurations, etc. By using an external connector, different diodes and resistors or different combinations of diodes and resistors may be chosen from the array.

Figure 1C:
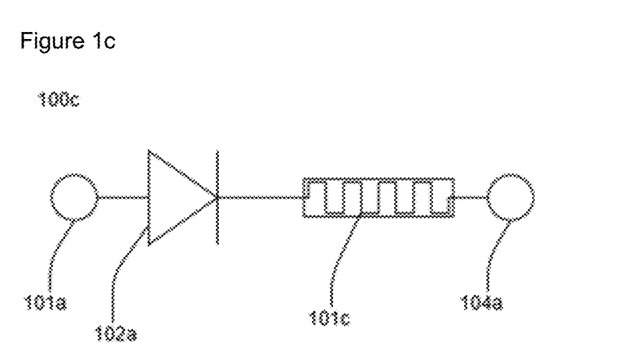
FIG. 1c illustrates a device with PUFs having a diode and a memristor.

FIG. 1c illustrates a device 100c with PUFs having a diode 102a and a memristor 101c. The device is similar with that illustrated in FIG. 1a except that instead having a resistor with a fixed value may be provided with a memristor whose resistance may be changed by different methods like applying a setting value such as voltage pulse or a voltage pulse sequence with particular parameters like voltage amplitude and pulse duration or by applying a voltage sweep or a voltage sweep sequence with particular parameters like maximum voltage value, number of steps, steps duration, etc.

Figure 1D:
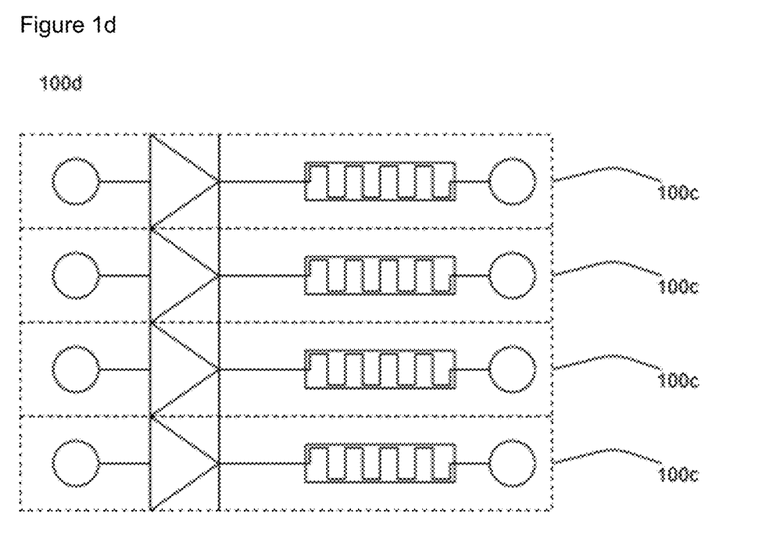
FIG. 1d illustrates a device with PUFs having an array of diodes and memristors.

FIG. 1d illustrates a device 100d with PUFs having an array of diodes and memristors similar with that illustrated in FIG. 1b except that instead of having resistors with fixed values, it may be provided with memristors whose resistance may be changed by different methods like applying a setting value such as voltage pulse or a voltage pulse sequence with particular parameters like voltage amplitude and pulse duration or by applying a voltage sweep or a voltage sweep sequence with particular parameters like maximum voltage value, number of steps, steps duration, etc.

For the physical unclonable function devices that may be set up in the form of an array (as seen in FIG. 1b and FIG. 1d), matrix or any other form, a switching mechanism may be implemented, so that only one or multiple selected elements of that array may be used at a given time, or during a given key generation. This mechanism may provide more dynamic random key generation, thus making it harder for the encrypted data to be decrypted by a malicious party. This mechanism may be implemented both in software, using various methods and algorithms, or at hardware level using different components like transistors, physical relays, micro switches, or any other hardware switching mechanism, be it mechanical or electrical. The switching mechanism may also use a combination of hardware and software.

Figure 2A:
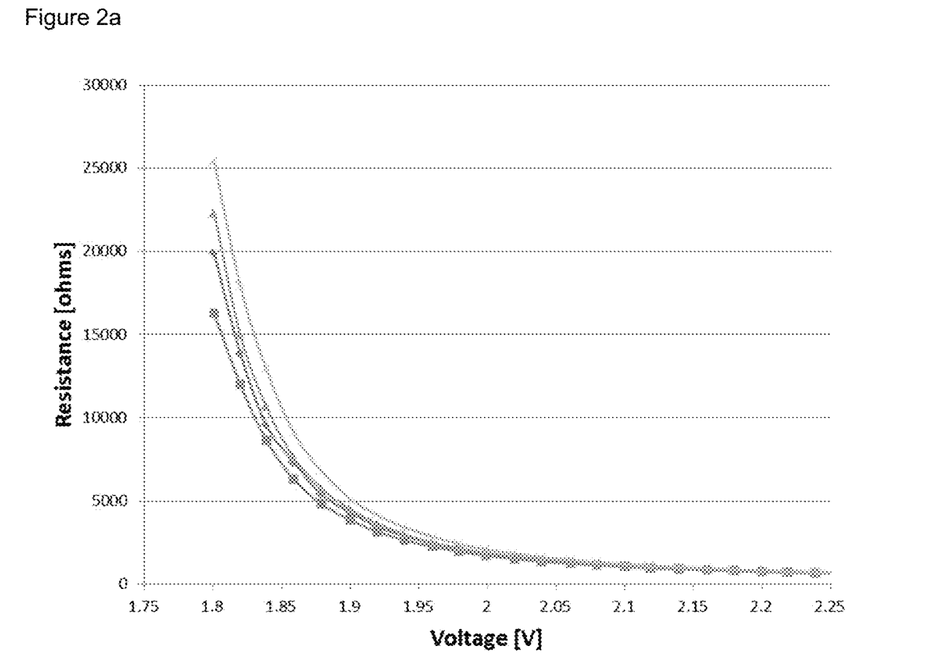
FIG. 2a shows an example of R-V measured characteristics, derived from the I-V characteristics, of nominally the same diodes and nominally the same resistors.

FIG. 2a shows an example of R-V measured characteristics, derived from the I-V characteristics, of nominally the same diodes and nominally the same resistors.

Figure 2B:
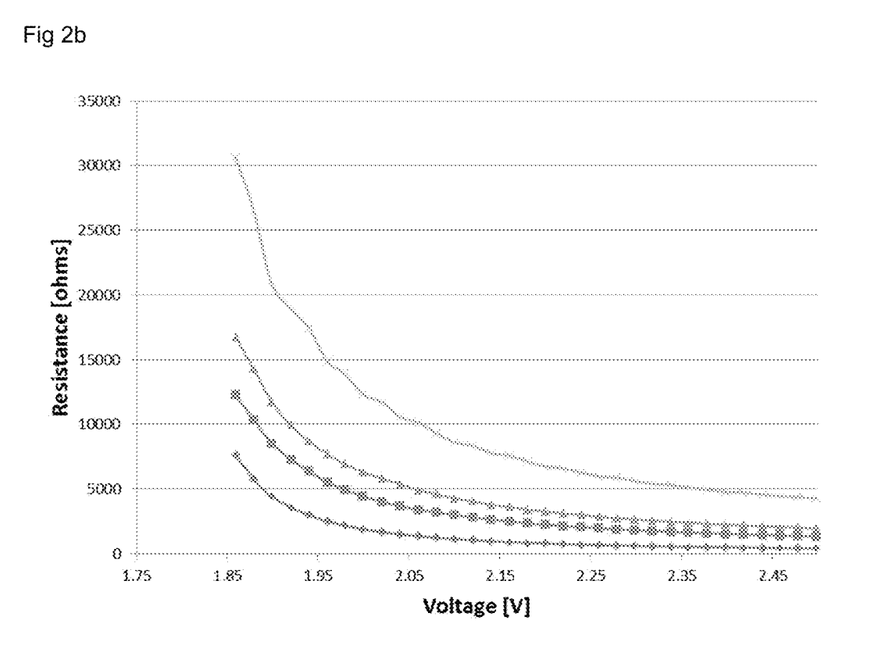
FIG. 2b shows an example of R-V measured characteristics, derived from the I-V characteristics, of nominally the same diodes and different resistors.

FIG. 2b shows an example of R-V measured characteristics, derived from the I-V characteristics, of nominally the same diodes and different resistors Due to the nonlinear R-V characteristics of the physical devices, the measured resistance value or a corresponding voltage or current of the device may depend on the voltage at which the measurements are made. In this way, multiple resistance values or corresponding voltages or currents may be obtained from a device by reading its resistance or a corresponding voltage or current at different voltage values.

It is important to note that any other type of semiconductor device or other type of device that may generate a nonlinear I-V characteristic may be used to create this physical unclonable function and to employ this method of key generation on multiple devices, not only diodes, resistors or memristors. Based on their nonlinear characteristics that may result from the type of material or on the unique differences that may appear as a result of the fabrication process or both, the device, be it of any type, and be it created after any fabrication process, may be used as part of this system and method described in this disclosure.

Figure 3:
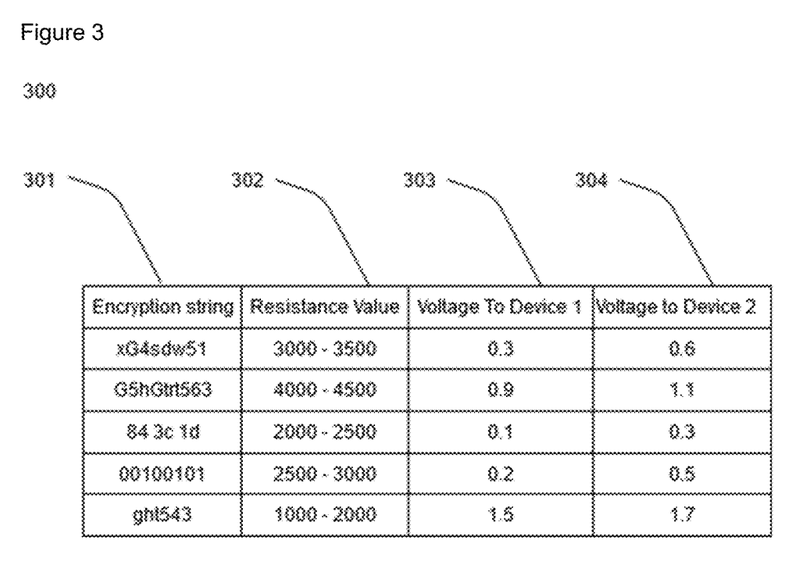
FIG. 3 is a table that is used to generate encryption keys based on the resistance values resulted from reading the devices with diodes and resistors or with diodes and memristors with different voltage values.

The encryption keys may be generated after translating the electrical resistance values (or corresponding voltages or currents) that result after reading a resistor and diode pair, memristor and diode or any other type of semiconductor device that has a nonlinear I-V characteristic, into strings of characters bits, bytes or any other type of encoding, by using a table similar to the one of FIG. 3, in which the first column represents the string of characters (301) assigned to a particular electrical resistance value (304) (or corresponding voltage or current). The second (302) and third (303) columns represent the voltage values that need to be sent (over the secondary channel) to two separate receiving devices (the voltage values for multiple devices, only one device or no voltage value may be stored in the table), to generate the same encryption key or a matching key that may be used to decrypt the data received. This can be done for any number of devices.

Two things should be noted concerning the translation tables present on the device that generates the encryption key to encrypt data, i.e. the sender device. Firstly, the voltage value that needs to be applied on the PUF generator of the sender device that has the translation table of FIG. 3 is not present. This is done mainly so that even in case a malicious party gains software access to the device, he won't be able to generate the encryption key by only sniffing (listening to the data received by the device) as he doesn't have the physical device used to generate the electrical resistance values that are transformed to encryption keys. Secondly, other devices may have different generated resistance values after the same voltage reading than the sender device, but it would generate the same key, or matching key, as the one generated on the sender device. For example, the key "xG4sdw51" of FIG. 3 element 301 could be generated on the sender for the electrical resistance between 3000 and 3500 and for the Device 1 (302) the same key could be generated for an electrical resistance value between 2000 and 2500, thus making the encryption of the communication inside of a network of systems created with PUF devices and assigned resistance translation tables extremely hard to break.

Figure 4:
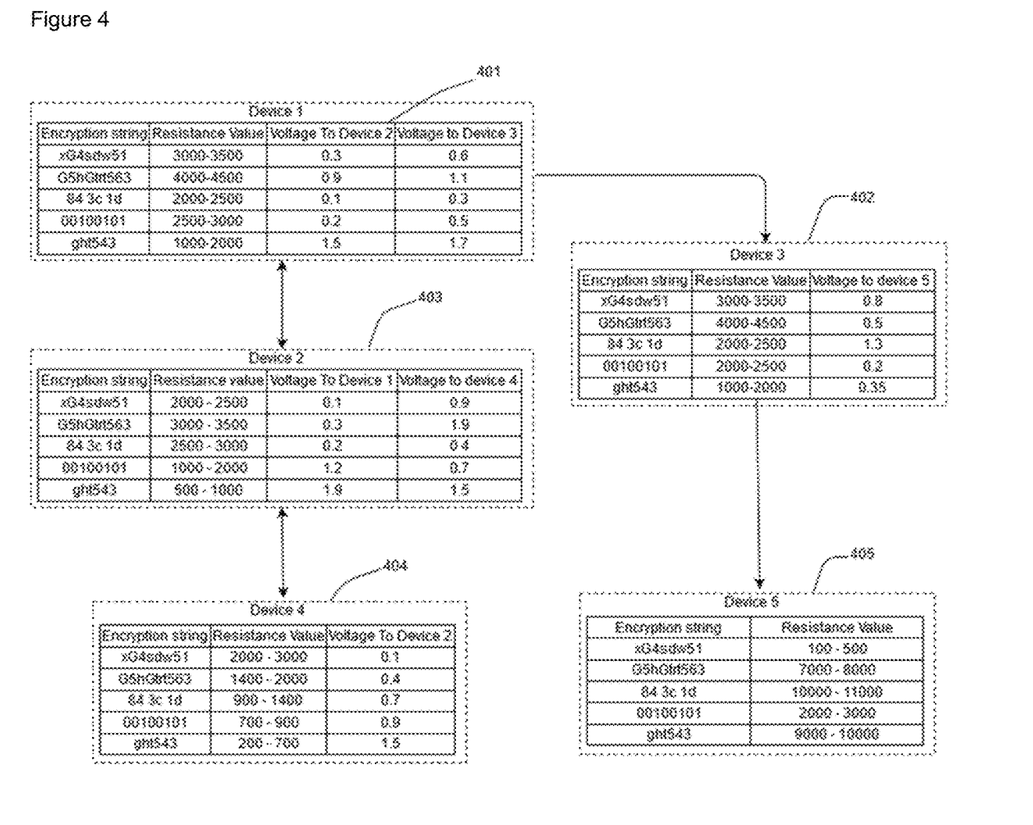

By using the physical unclonable functions for generating random keys we may also create a network of such devices, in which each device may send and/or receive data to/from one or multiple devices. The devices in the network may be set up in such way that they may send and receive data from one or multiple devices, only be able to send data to one or multiple devices or only be able to receive data from one or multiple devices. All of these types of communication may be done by setting the key generation tables in a similar way to the ones seen in FIG. 4, so that a device may only know what voltage values to send to the systems it needs to communicate with, so that they may generate the matching keys needed to decrypt the received data. For example, device 1 (401) may send and receive data to and from device 2 (403) but it may only send data to device 3 (402), as device 3 (402) doesn't know what voltage values to send to device 1 (401) so that he can decrypt the encrypted data. Device 5 (405) may only receive data from device 3 (402), but he may not send data to any of the devices. As it can be seen in FIG. 4, on different devices, the partial encryption keys may be generated at different resistance values; the devices know what key to generate by the voltage values received, which are stored inside of the tables of the sender. For example, on device 2(403) the key "ght543" is generated for a resistance value between 500 and 1000, and for device 1(401) it is generated for a resistance value between 1000 and 2000, but device 1(401) knows that it needs to send 1.5 volts to device 2(403) to generate the same key, without knowing what resistance it will result after reading the physical unclonable function device with that voltage.

Figure 5:
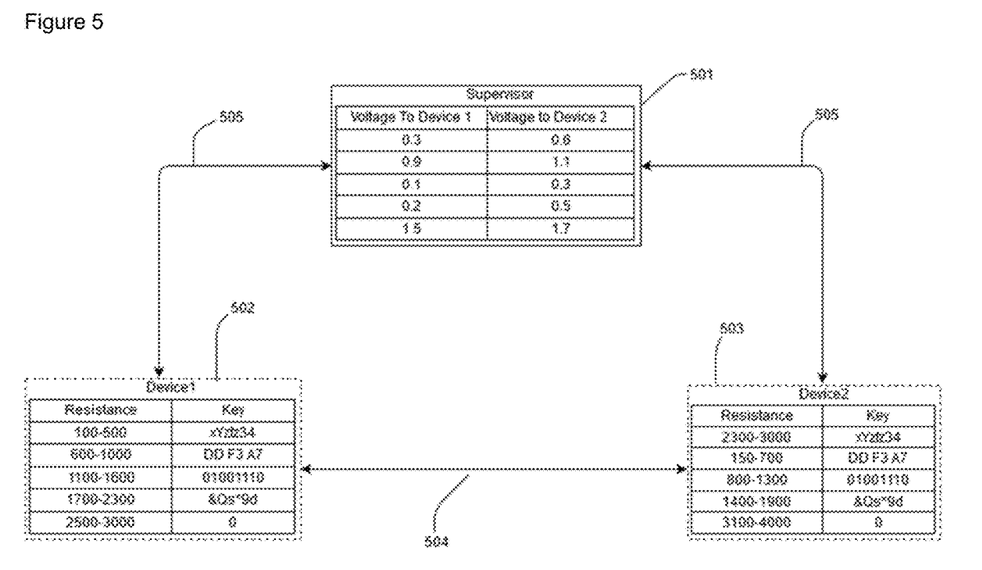
FIG. 5 shows a centralized unit that has stored all the matching voltage values for multiple devices so that it may enable communication between them, by sending those voltages, over the secondary channel, to the devices that need to communicate.

In case a centralized approach is needed, an additional device may be used to supervise and facilitate the communication between devices; this centralized approach can be seen in FIG. 5, where the central (501) holds the voltage values that need to be applied to generate keys, for each device. By using a supervisor (501) for facilitating communication, what remains on all of the devices that are tied to this supervisor is only the resistance value and the attributed key. The voltage match (that is what voltage to send to two devices to generate the same key) is stored on the supervisor, who may initiate the communication between devices on its own or after a signal is received from one of the devices (502)(503) that a data transfer is needed. After the supervisor (501) gets a signal that a data transfer is in order, it generates a vector of voltages that is transmitted to the device that it needs to send data, and then, by using the table that matches voltages between devices, it generates a voltage vector that is sent to the receiver or receivers of data. It is important to state that the sending of these voltage vectors may be done by using a secondary data transfer channel, different from the Ethernet; by doing this, the supervisor (501) may be completely disconnected from the Ethernet channel, and communicate only on the secondary channel, thus rendering him immune to any type of Ethernet based malicious attack or any attempt at spoofing or reading the data stored on it. After the sender (502) receives the vector of voltages it applies it to the PUF device, that may be a diode and a resistor, a vector or matrix of diodes and resistors, a diode and a memristor, a vector or matrix of diodes and resistors, etc., resulting in an array of resistance values. The array of resistance values are transformed to encryption keys that may be used as one encryption key after they are concatenated. The sender (502) encrypts the data and then transfers it to the receiver (503), which, based on the voltage vector received from the supervisor (501), generates the same encryption key by using the voltage values in that vector on the PUF device, turning them into resistance values and then converting them into characters, strings of characters, numbers or any type of encoding, and then forming the key needed to decrypt the data received from the sender device (502).

Any number of devices may be connected to this supervisor, not only to as is depicted in FIG. 5. Also, a sender device may send data to any number of receivers, by sending a message on the second channel to the supervisor (501) with the information that lets the supervisor know to what devices to send voltage vectors to (this happens if the devices are allowed to request a data transfer from the supervisor). In case the devices are not allowed to request a data transfer from the supervisor, and only the supervisor has the ability to start a data transfer between devices, it may generate a vector of voltages that is sent to the sender device and additional information about to which devices to send the data to will be included in the message, and then generate the voltage vectors for the receivers, and send it to them, so that they may generate the keys needed to decrypt the data received.

In every embodiment of this invention we may dynamically change the tables that translate resistance values to encryption keys. Any combination of switching the values in the table of those devices is possible, be it only generating a new key attributed to a resistance value interval, changing the way in which the resistance value intervals match to given keys or generating new keys and also changing the matching order. This can be done in various ways, with a predefined algorithm, be it hardware or software implemented, or by using information sent between devices or both.

These methods of generating keys may also be used as a part of the systems of the "Cybersecurity System for Internet of Things Connected Devices" (US 2019/0132340 A1), using one or multiple physical relays to cut the connection to the first channel and/or second channel when generating keys, for extra security.

Figure 6:
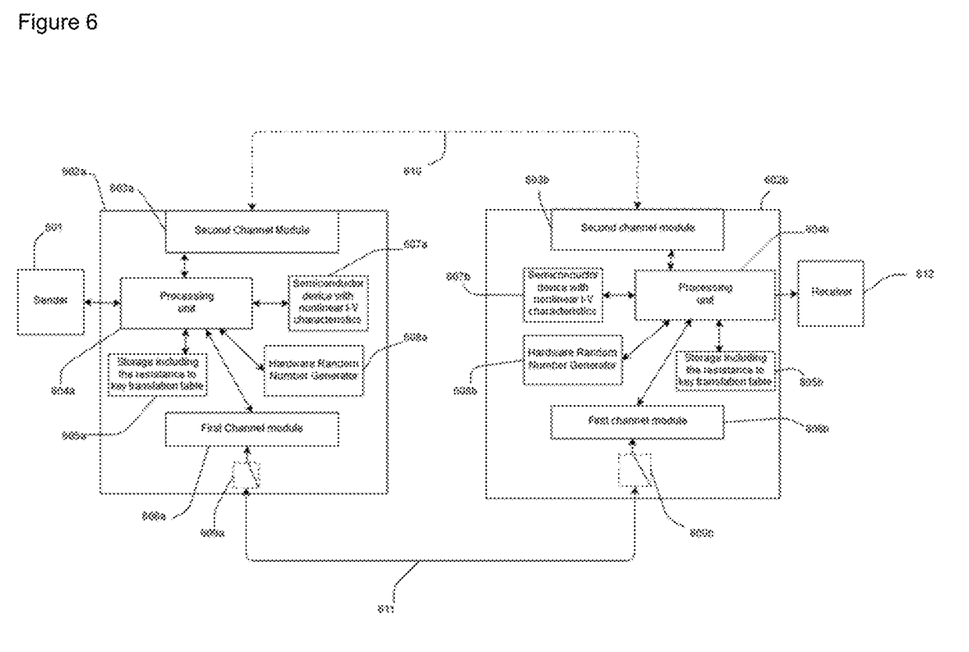
FIG. 6 describe how the communication between two systems using semiconductors with nonlinear I-V characteristics, a random number generator and the tables that match the encryption keys.

In FIG. 6 two systems that use the capacity of semiconductors with nonlinear characteristics (that may be diodes, diodes and resistors, diodes and memristors, etc.) (607a)(607b), combined with the tables that translate resistance values to strings of characters, bits, bytes, etc., (605a)(605b) and two separated communication channels, in which one or both channels may be separated by a physical relay (609a)(609b) may be used to physically cut off the connection of the system (602a)(602b) and/or the protected devices (601)(612). This system (602a)(602b) may also have included a random number generator (608a)(608b) that may have multiple uses within the system, including the generation of the voltage vector that is transferred between devices to generate the encryption/decryption keys on those devices, using the semiconductor devices with nonlinear I-V characteristics (607a)(607b). The physical relay (609a)(609b) and the random number generator (608a)(608b) may or may not be used as part of this system, their use are optional for extra security. The hardware random number generator (608a)(608b) may be a hardware true random number generator.

The data transfer between the two devices (601)(612), that are protected by the system (602a)(602b) of this disclosure, happens by applying a vector of voltage values on the semiconductors with nonlinear I-V characteristics (607a) of the system (602a). This will result in a vector of resistance values that will be translated using the table stored in the storage (605a) of the system (602a) protecting the sender (601). The data from the sender is then encrypted using the resulted key, with an encryption algorithm in processing unit (604a), that may be symmetric or asymmetric, that may be software implemented or implemented directly at hardware level. The voltage values vector, or a matching vector that when used on the semiconductor device with nonlinear characteristics (607b) of the system (602b) will generate the key needed to decrypt the data received over the first channel (611), is then sent to the system (602b) using the secondary channel (610) and the encrypted data is sent over the main channel (611). On the system (602b) the voltage values vector received over the second channel (610) is applied on the semiconductor device with nonlinear I-V characteristics (607b), resulting in a vector of electrical resistance values that is transformed, by using the table stored (605b) to generate the key needed to decrypt the data received over the first channel (611). The data decrypted by a decryption algorithm in processing unit (604b) is then sent to the receiver (612). The stored tables (605a)(605b) may be like the translation tables described in FIG. 3, or may have another similar form. These tables may be stored in different ways, be it by classical binary storage methods or be stored on other hardware storage devices like memristor based storage devices. The processing unit (604a)(605b) may be used to encrypt/decrypt the data, apply voltage values on the semiconductors with nonlinear I-V characteristics, send data to the right receiver, translate the resistance values to encryption keys, generate a the voltage vector used to generate resistance values when there is no hardware random number generator, etc.

What is claimed is:

1. A system used for generating encryption keys on multiple devices and for encrypted data transfer between two or multiple devices comprising:
    a sender system including at least one sender device with nonlinear I-V (current-voltage) characteristics, a processor unit including a sender generator constructed and arranged to generate at least one setting value or at least one reading value or both, a storage unit including one or more resistance to key translation tables, a hardware random number generator and a physical relay;
    a receiver system including at least one receiver device with nonlinear I-V characteristics, a processor unit including a sender generator constructed and arranged to generate at least one setting value or at least one reading value or both, a storage unit including one or more resistance to key translation tables, a hardware random number generator and a physical relay;
    a first channel coupling the sender system and the receiver system; and
    a second channel, different from the first channel, coupling the sender system and the receiver system, wherein:
    the sender generator applies the at least one setting value or the at least one reading value or both to the at least one sender device with nonlinear I-V characteristics to cause the at least one sender device with nonlinear I-V characteristics to generate at least one sender output value,
    the sender system applies the at least one sender output value to the sender table to create a string of characters or bits or bytes or numbers,
    the sender processing unit encrypts data using the string of characters,
    the sender system transmits the encrypted data to the receiver over the first channel to the receiver system,
    the sender system transmits a voltage value associated with the receiver system and related to the at least one setting value or the at least one reading value or both to the receiver system over the second channel, or the transmitted values are sent to both the sender and the receiver from a third device,
    the receiver generator applies the at least one setting value or the at least one reading value or both, based on the transmitted voltage value to the at least one receiver device with nonlinear I-V characteristics to cause the at least one receiver device with nonlinear I-V characteristics to generate at least one receiver output value,
    the receiver system applies the at least one receiver output value to the receiver table to create the string of characters from the at least one receiver output value, and
    the receiver processing unit generates the data from the encrypted data using the string of characters.

2. The system of claim 1 wherein the first channel is a wired channel and the second channel is a wireless channel.

3. The system of claim 1 wherein a switching mechanism may be used to select on which diode or multiple diodes to apply voltage to, from an array of diodes; this switching or selection mechanism may be implemented in hardware, software or a combination of hardware and software.

4. The system of claim 2 wherein the first channel employs an Ethernet protocol and the second channel employs a GSM, GPRS, CDMA, LTE or G5 based protocol.

5. The system of claim 1 where the at least one sender device or the at least one receiver device contains at least a diode and at least a resistor.

6. The system of claim 5 where the resistor has a fixed resistance value.

7. The system of claim 5 where the resistor has a variable resistance value.

8. The system of claim 5 where the resistor may be replaced by a memristor.

9. The system of claim 5 where the diode is an electroluminescent diode.

10. The system of claim 5 where the diode is a laser diode.

11. The system of claim 5 where the diode is a Schottky diode.

12. The system of claim 1 where the at least one sender device or the at least once receiver device includes a semiconductor device which presents a nonlinear I-V characteristic, wherein the characteristic varies depending on production process input parameters.

13. A method of generating encryption keys on multiple devices, without transferring the keys comprising:
    applying at least one sender reading value, comprising a voltage associated with a receiver, to the at least one sender device containing at least one diode and at least one resistor with a fix value to generate at least one sender output value;
    determining a string of characters from the at least one output value based on a sender table that translates the electrical resistance or any other type of value generated based on the physical unclonable function to a number, a character, a string of characters, a bit, multiple bits, a byte or multiple bytes;

encrypting data with the string of characters, bits or bytes resulted, by using a hardware or software algorithm;

transmitting the encrypted data to the receiver through a first channel;

transmitting the at least one sender reading value to the receiver through a second channel different from the first channel or the same channel;

applying the at least one sender reading value to at least one receiver device containing at least one diode and at least one resistor with a fix value to generate at least one receiver output value;

using a receiver table to determine the string of characters from the at least one receiver output value; and decrypting the encrypted data with the string of characters resulted after translating the resistance value to a string of characters, bits, bytes or numbers using the receiver table.

14. A method of generating encryption keys on multiple devices, without transferring the keys comprising:

setting at least one sender device containing at least one diode and at least one memristor using at least one sender setting value;

applying at least one sender reading value, comprising a voltage associated with a receiver, to the at least one sender device containing at least one diode and at least one memristor to generate at least one sender output value;

determining a string of characters from the at least one output value based on a sender table;

encrypting data with the string of characters;

transmitting the encrypted data to the receiver through a first channel;

transmitting the at least one sender setting value or the at least one sender reading value or both to the receiver through a second channel different from the first channel;

applying the at least one sender setting value or the at least one sender reading value or both to at least one receiver device containing at least one diode and at least one memristor to generate at least one receiver output value;

using a receiver table to determine the string of characters from the at least one receiver output value; and decrypting the encrypted data with the string of characters from the receiver table.

* * * * *